Dec. 16, 1952  E. O'SULLIVAN ET AL  2,621,388
MOLD FOR MOLDING CONCRETE LINTELS
Filed Jan. 26, 1948  2 SHEETS—SHEET 1
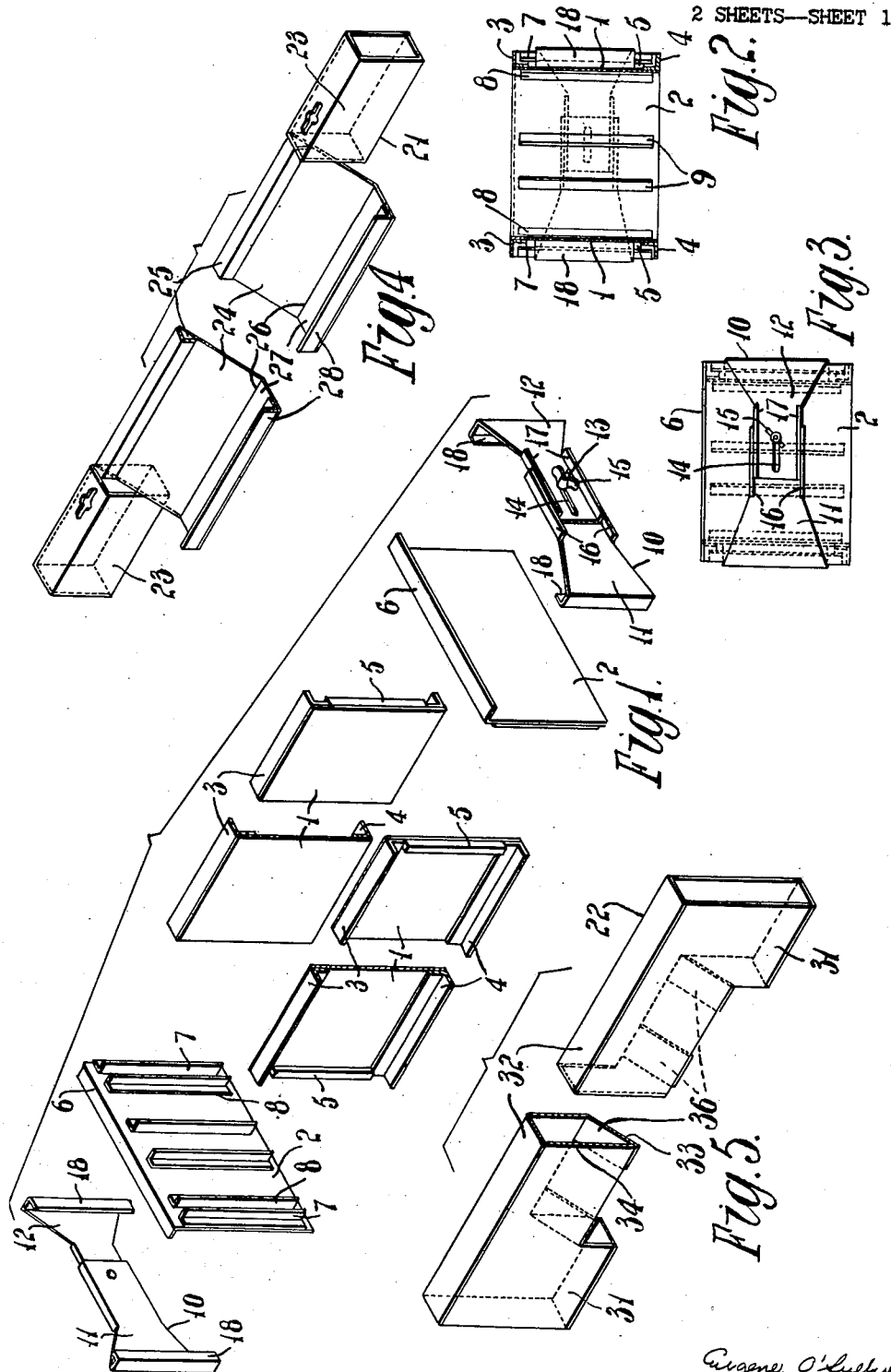

Dec. 16, 1952

E. O'SULLIVAN ET AL 2,621,388

MOLD FOR MOLDING CONCRETE LINTELS

Filed Jan. 26, 1948

Eugene O'Sullivan
By Michael S. Pineles
Attorney

Patented Dec. 16, 1952

2,621,388

UNITED STATES PATENT OFFICE 2,621,388

MOLD FOR MOLDING CONCRETE LINTELS

Eugene O'Sullivan, Chislehurst, England

Application January 26, 1948, Serial No. 4,335
In Great Britain January 28, 1947

4 Claims. (Cl. 25—118)

This invention relates to the construction of lintels or beams such as are used over window, door and like openings in buildings of various kinds. It has amongst its principal objects the provision of improved apparatus by means of which a lintel of concrete or other like material may be either pre-cast or preferably constructed in situ in an efficient and economical manner. A further object of the invention is the production of lintels which possess a number of important advantages over lintels such as are known at present.

According to the invention, in one of its aspects, a lintel of concrete or like material is constructed in a mould by forming in the mould a lower part of the lintel, inserting a layer of damp-resistant material above the said lower part of the lintel, inserting a core member in the mould above the said layer and forming the remainder of the lintel above the core member.

Preferably a lower core member is also used having a laterally inclined under surface. This core member is first inserted in the mould after which the lower part of the lintel is formed with a correspondingly inclined upper surface. The damp-resistant layer is then inserted, followed by the first said or upper core member, after which the remainder of the lintel is formed about this core member.

For constructing the lintel a mould is provided which may, according to a further feature of the invention, comprise a mould casing within which the lintel is adapted to be formed, a core member the depth of at least part of which is less than the internal depth of the mould and means for removably positioning the core member within the mould casing extending longitudinally thereof.

A preferred form of mould according to the invention is provided with two core members, a lower core member which has a laterally inclined under surface extending along at least part of its length and adapted to produce a correspondingly inclined upper surface on the part of the lintel formed beneath it and an upper core member which is adapted to be inserted in the mould after the removal of the lower core member and which is adapted to cooperate with the said inclined upper surface of the lintel part to form a longitudinal cavity in the finished lintel.

By means of the invention a lintel may be constructed which comprises a layer of damp-resistant material extending across it from side to side and which is formed with a longitudinally extending cavity above the said layer. Such a lintel may either be pre-cast and subsequently erected in position in the building or it may be constructed in situ over the appropriate opening. The latter method will generally be found to be preferable.

The invention is particularly applicable to lintels for buildings having hollow or cavity walls but it is not limited thereto.

The invention will now be described in greater detail, by way of example, as applied to the construction in situ of a window lintel in a building which is being erected with concrete cavity walls.

Reference will be made to the accompanying drawings in which:

Figure 1 is an isometric view, partly broken away, showing the parts of the mould casing before assembly;

Figure 2 is a transverse sectional view taken through the assembled mould casing of Figure 1 and looking in the direction of one of its ends;

Figure 3 is an end view of the assembled mould casing;

Figure 4 is an isometric view of a lower core member which is adapted to be fitted in the mould casing of Figures 1 to 3;

Figure 5 is a similar isometric view of an upper core member which is adapted to be fitted in the mould casing after the removal of the lower core member;

Figure 7:
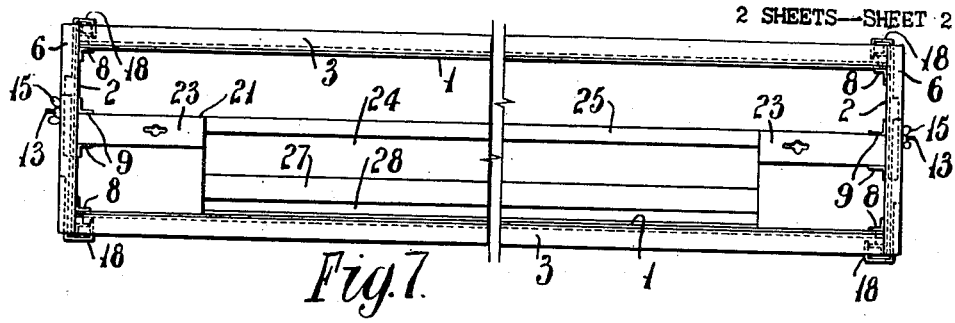
Figure 7 is a plan view of the mould assembled ready for use with the lower core member in position.
Figure 8:
Figure 8 is a similar view of the mould with the lower core member removed and the upper core member in position, the mould being otherwise empty.

Referring to the drawings the mould casing comprises a pair of side plates 1 and a pair of end plates 2 which are adapted to be assembled together to form a mould casing in which the lintel is to be formed.

Each of the side plates 1 is formed from flat sheet steel along the upper and lower edges of which steel angles 3 and 4 are welded. At each end of each of the plates 1 a vertical rib 5 of rectangular bar iron is welded to the plate, the length of the rib being equal to the distance between the inner edges of the angles 3 and 4.

The end plates 2 are also formed of flat sheet steel, the upper edges of the plates being bent outwardly to form stiffening flanges 6. At each end of each of the end plates 2 two parallel vertical ribs 7 and 8 of angle material are welded in position, the distance between the ribs corresponding to the combined thickness of the rib 5 and side plate 1. The lengths of the ribs 7 and 8 are slightly less than the height of the end plates and side plates so that when the parts are assembled the ribs 7 can fit between the angles 3 and 4.

Each end plate 2 is also provided with a pair of central, generally vertical, ribs 9 which are welded in position and the distance between which corresponds to the width of the core members.

For connecting the end and side plates together when the mould is assembled a pair of plate locks indicated generally at 10 are provided. Each of these locks consists of two parts 11 and 12 which are adjustably connected together by means of a stud 13 which is provided on the part 11 and which passes through a slot 14 formed in the part 12 and by a wing nut 15 which is screwed on the stud 13. The edges of the central parallel-sided section of the part 11 are bent over to form parallel flanges 16, while the edges of the central parallel-sided section of the part 12 are bent over to form similar parallel flanges 17 which are slidable between the flanges 16. Thus the parts 11 and 12 are guided for parallel telescopic movement relatively to each other.

The ends of the parts 11 and 12 are bent twice at right angles so as to form lips 18 which are adapted to engage behind the ribs 5.

For use with the mould casing described above two core members are provided, a lower core member 21, which is best shown in Figure 4, and an upper core member 22 which is best shown in Figure 5.

The lower core member 21 comprises two end sections 23 which are formed of sheet metal bent to a rectangular shape, the edges being joined by welding at the corners. The end sections 23 are joined together by an intermediate section 24 which is also formed of sheet steel. The sections 23 and 24 are connected together by welding or other means.

The upper edge of the section 24 is bent over twice to form a triangular stiffening rib 25, while its lower edge is bent at an obtuse angle at 26 to provide a horizontal part 27 along the edge of which a stiffening member 28 of angle iron is attached by welding. It will be apparent that the main sloping part of the intermediate section 24 has an under surface which is inclined laterally with respect to the length of the core member, sloping up from the level of the bottoms of the end sections 23.

The upper core member 22 also comprises two end sections 31 of rectangular section which are connected together by means of an intermediate section 32. The end sections 31 are of a length and width equal to those of the end sections 23 of the lower core member 21, but their depth is greater, being equal to the internal depth of the mould.

The intermediate section 32, which is formed integrally with the end sections 31, is of similar rectangular cross section in its upper part but its bottom part is cut away at an angle as indicated at 33. In the construction shown the two side walls 34 and 35 of the section 32 are connected together at their lower edges by means of a number of separate connecting pieces 36, but if desired the bottom of the section 32 could be completely closed. The slope of the pieces 36 corresponds to that of the section 24 of the lower core memebr 21.

Figure 6:
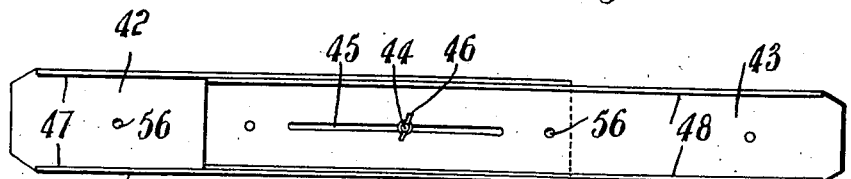
Figure 6 is an underneath plan view of a support plate which is intended to be used in the construction of a lintel in situ over an opening.

For use in conjunction with the mould described a telescopic supporting plate 41 such as is shown in Figure 6 is provided. This plate 41 consists of two parts 42 and 43 which are adjustably connected together by means of a stud 44 which projects from the underside of the part 42 through a slot 45 in the part 43 and is provided with a wing nut 46. The edges of the part 42 are bent down to form parallel side flanges 47, while edges of the part 43 are bent down in a similar manner to form flanges 48 which are slidable between the flanges 47.

The use of the above apparatus in constructing a lintel over a window opening in a hollow or cavity wall will now be described in connection with Figs. 7 to 10. The wall, which consists of an inner wall 51 and an outer wall 52 separated by a cavity 53, is built up on each side of the window frame a part of the top of which is shown at 54 in Figures 9 and 10. When the walls are level with the top of the frame 54, the plate 41 is fitted across the opening inside the frame with its ends supported on the edges of the wall. The adjustable connection between the parts 42 and 43 enables the length of the plate 41 to be adjusted to the width of the opening.

In order to provide support for the plate 41 and to prevent it from sagging, one or more struts such as 55 are provided. These are fitted between the plate 41 and the sill of the window with their upper ends located by pins such as 56 provided on the under side of the plate 41.

To enable the struts 55 to be adapted to window openings of different heights they are preferably made telescopic. In the drawings tubular struts are shown but alternatively struts of channel section could be used. A suitable strut could be constructed in a similar manner to the plate 41 itself, but would be provided with a foot plate at one end and with a suitable socket at the other to receive the pin 56.

When the plate 41 has been fitted in the position shown the mould casing comprising the side plates 1 and the end plates 2 is assembled in position above the plate 41 and window frame 54 using the lock plates 10 which are fitted over the end plates with the lips 18 engaging behind the ribs 5 on the side plates. The lock plates are clamped in position by tightening the nuts 15, The lower core member 21 is then inserted in the mould casing with its end sections 23 engaged between the ribs 9 and resting on the plate 41. The horizontal part 27 of the central section 24 rests on the upper surface of the window frame 54, while the stiffening flange 28 fits against the inside of the side plate 1.

Figures 9, 10:
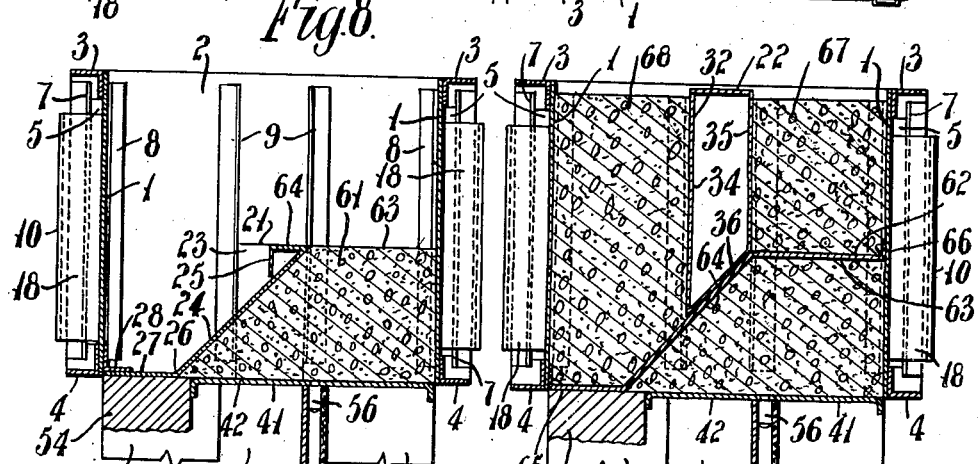
Figure 9 is a transverse sectional view, to a larger scale, showing the first stage in the construction of a lintel, the section being taken perpendicular to the longer dimension of Figure 7.
Figure 10 is a view similar to Figure 9 but showing a later stage in the construction of the lintel.

Concrete 61 is then run into the mould, as shown in Figure 9, behind and under the central section 24 of the lower core member and behind the end sections 23 thereof up to the level of the top of the core member.

When this concrete is sufficiently firm the lower core member 21 is removed and a layer 62 of damp-resistant material such as sheet lead is placed over the upper horizontal and inclined surfaces 63 and 64 of the concrete 61 within the mould as shown in Figure 10. The width of the layer 62 is such that its outer and inner edges 65 and 66 can be bent up in contact with the side plates 1 of the mould.

The upper core member 22 is then inserted in the mould with its end sections 31 fitting between the ribs 9 with their lower parts occupying the spaces left in the concrete formed by the end sections 23 of the lower core member. The inclined bottom 33 of the intermediate section 32 fits against the lead layer 62 above the inclined upper surface 64 of the concrete 61.

With the upper core member 22 in position concrete 67 and 68 is run into the mould behind and in front of the core member 22 up to the top of the mould. When this concrete has set sufficiently the upper core member 22 is removed.

Finally, the mould itself is dismantled and taken away and the support plate 41 is also removed. This can easily be done if, after the removal of the struts 55, the parts 42 and 43 of the plate 41 are telescoped together.

The removal of the mould will expose the edges 65 and 66 of the lead layer 62. These edges are then turned downwardly, the edge 65 being particularly important in that it prevents the entry of water between the bottom of the lintel and the top of the window frame 54.

It will be seen that by the above means a lintel has been produced having a cavity which marries with the cavities 53 in the adjoining walls. The lintel includes within itself a lead or other damp-resistant layer which extends with a downward and outward slope beneath the bottom of the lintel cavity and which projects from the outer surface of the lintel above the window frame. This ensures that the structure is completely weather-proof. Furthermore when the hollow wall is continued above the lintel the cavity in this wall can be made continuous with the cavity in the lintel.

Any suitable steel or other reinforcement can be included in the lintel during the manufacture of the latter.

In order to make the removal of the core members easier it may be preferred to give the end sections of the core members 21 and 22 a slight taper from top to bottom, it generally being sufficient, for a lintel of average size, to make the width at the top of the upper core about a quarter of an inch greater than the width at the bottom thereof. The ribs 9 would naturally then be mounted on the end plates at the appropriate small anges to each other.

To strengthen the mould casing and to prevent its sides from distorting when the concrete is rammed in, one or more steel or other straps may be provided adapted to encircle the mould and the support plate 41.

The invention is particularly applicable to the lintels of buildings which are being constructed with hollow concrete walls using the methods and apparatus described in the specification of United Kingdom Patent No. 550,564 and of pending application No. 7,289 of 1945. The invention is not, however, limited thereto but is applicable to concrete and other buildings constructed by other means, with or without cavity walls. It is also applicable to buildings of brick and other materials, while it is not necessary that the lintels should be cast in situ. They might be constructed separately and then built into place by methods incorporating various features of the present invention with only slight modifications. The moulds and other parts may be constructed with any desired dimensions according to the sizes of lintels required.

I claim:

1. In a mold for constructing out of concrete or like moldable material a lintel extending over an opening between spaced parts of a wall structure: the improvement comprising, in combination, a mold casing comprising spaced side plates and end plates confining an elongated mold cavity; an elongated core structure and cooperating elements on the end plates of said casing removably holding said core structure in a predetermined operative position within said casing; said core structure comprising two vertically extending end core sections of generally rectangular cross-section, each having opposite side walls spaced from the opposite side walls of said casing side plates for forming therewith hollow end regions of the lintel extending over at least part of the height of said casing; said core structure also having an intermediate core section extending between said two end core sections, and extending laterally to a line adjacent one of said casing side plates, said intermediate core section also comprising a downwardly-facing shaping wall which is connected to said two end core sections above the level of the bottom parts of the latter and which is laterally inclined at an acute angle relatively to the plane of one of said casing side plates for giving a laterally inclined water deflecting surface to moldable material filled into the interior of said casing below said intermediate core section and to thereby provide a lower section of said lintel within said casing.

2. In a mold as claimed in claim 1, said end plates being detachable from said side plates and including means joining said end plates and said side plates into a substantially rigid mold casing.

3. In a mold as claimed in claim 1, said end plates being detachable from said side plates and including a pair of clamps, each of which is adapted to extend across the outer side of the associated end plate and clampingly engage adjacent ends of said side plates for joining them to the end plates to form a substantially rigid mold casing.

4. In a mold as claimed in claim 1, said end plates being detachable from said side plates, the cooperating elements on said end plates comprising a pair of generally vertical guide elements on the inside of each of said end plates for guiding and holding said core structure, said end plates including means for joining said end plates and said side plates into a substantially rigid mold casing.

EUGENE O'SULLIVAN.

REFERENCES CITED

The following references are of record in the file of this patent:

UNITED STATES PATENTS

| Number | Name | Date |
|---|---|---|
| 649,892 | Jones | May 15, 1900 |
| 814,657 | Low | Mar. 6, 1906 |
| 1,370,160 | Schenk | Mar. 1, 1921 |
| 1,562,044 | Patterson | Nov. 17, 1925 |
| 1,636,253 | Smith | July 19, 1927 |
| 1,976,628 | O'Rourke | Oct. 9, 1934 |
| 2,020,065 | Kimbrough | Nov. 5, 1935 |
| 2,228,246 | Bergan | Jan. 14, 1941 |
| 2,296,562 | Maxwell | Sept. 22, 1942 |